(12) United States Patent
Cheng

(10) Patent No.: US 9,071,402 B2
(45) Date of Patent: Jun. 30, 2015

(54) SELECTION OF RETRANSMISSION SETTINGS FOR HARQ IN WCDMA AND LTE NETWORKS

(75) Inventor: Jung-Fu Cheng, Cary, NC (US)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 328 days.

(21) Appl. No.: 12/406,256

(22) Filed: Mar. 18, 2009

(65) Prior Publication Data

US 2009/0238066 A1  Sep. 24, 2009

Related U.S. Application Data

(60) Provisional application No. 61/038,913, filed on Mar. 24, 2008.

(51) Int. Cl.
H04B 7/216 (2006.01)
H04L 1/00 (2006.01)
H04L 1/18 (2006.01)

(52) U.S. Cl.
CPC ............ *H04L 1/0067* (2013.01); *H04L 1/0071* (2013.01); *H04L 1/1819* (2013.01); *H04L 1/1893* (2013.01)

(58) Field of Classification Search
CPC ... H04W 24/00; H04L 43/50; H04L 43/0852; H04L 43/08; H04B 17/003
See application file for complete search history.

(56) References Cited

U.S. PATENT DOCUMENTS

| 7,155,655 | B2  | 12/2006 | Cheng |
| 7,185,257 | B2  | 2/2007  | Kim et al. |
| 7,237,170 | B2* | 6/2007  | Ratasuk et al. ............... 714/748 |
| 7,366,477 | B2* | 4/2008  | Sebire et al. .................... 455/69 |
| 7,372,837 | B2* | 5/2008  | Kinjo et al. .................... 370/338 |
| 7,477,628 | B2* | 1/2009  | Hagiwara et al. ............ 370/335 |
| 7,620,872 | B2* | 11/2009 | Kwon et al. .................. 714/751 |
| 2004/0081248 | A1* | 4/2004  | Parolari ........................ 375/259 |

(Continued)

FOREIGN PATENT DOCUMENTS

| EP | 1313250 B1 | 3/2006 |
| WO | WO 03/032564 A2 | 4/2003 |

(Continued)

OTHER PUBLICATIONS

Ibing A. et al. "Joint Transmission and Detection in Hexagonal Grid for 3GPP and Detection in Hexagonal Grid for 3GPP LTE" Jan. 23, 2008, Information Networking, 2008. ICOIN 2008. International Conference on, IEEE, Piscataway, NJ, USA, pp. 1-5, XP031238860, ISBN: 978-89-960761-1-7, ISBN: 978-89-960761-1-7.

(Continued)

*Primary Examiner* — Steven H Nguyen

(57) ABSTRACT

Improvements in the performance of HARQ operation are achieved by considering two channel coding parameters, the number of filler bits F and the number of dummy bits $N_D$, in the selection of the retransmission settings for HARQ operation. In one exemplary embodiment, an optimal RV setting for the retransmission is selected based on the number of filler bits F and the number of dummy bits $N_D$. In another exemplary embodiment, an address offset to the RV starting point for a selected RV setting is selected based on the number of filler bits F and the number of dummy bits $N_D$.

18 Claims, 8 Drawing Sheets

(56) References Cited

U.S. PATENT DOCUMENTS

| | | |
|---|---|---|
| 2005/0076283 A1 | 4/2005 | Malkamaki et al. |
| 2008/0090517 A1 | 4/2008 | Cheng |
| 2009/0028129 A1* | 1/2009 | Pi et al. .................. 370/351 |
| 2009/0086849 A1* | 4/2009 | Tsai et al. .................. 375/298 |
| 2009/0199062 A1* | 8/2009 | Shen et al. .................. 714/748 |

FOREIGN PATENT DOCUMENTS

| | | |
|---|---|---|
| WO | WO 2004/038990 A1 | 5/2004 |
| WO | WO 2005/109727 A1 | 11/2005 |

OTHER PUBLICATIONS

Song Y. et al.: "Collaborative MIMO, IEEE C802.16m-07/244r1" [Online] Nov. 7, 2007, IEEE 802.16 Broadband Wireless Access Working Group, pp. 1-9, XP002547035.

Samsung: "Inter-Cell Interference Mitigation Through Limited Coordination" Aug. 12, 2008, 3GPP Draft;R1-082886 Inter-Cell Interference Mitigation Through Limited Coordination,3rd Generation Partnership Project (3GPP), Mobile Competence Centre ; 650, Route Des Lucioles ; F-06921 Sophia-Antipolis Cedex; France , XP050316366, pp. 1-10.

Etri: "Frame Structure to Support Inter-cell Interference Mitigation for Downlink Traffic Channel using Co-MIMO and FFR" [Online] Jan. 6, 2008 (Jan. 16, 2008), IEEE 802.16M-08/017, pp. 1-8, XP002532561.

3GPP TS 25.212 V7.7.0 (Nov. 2007, 3rd Generation Partnership Project; Technical Specification Group Radio Access Network; Multiplexing and channel coding (FDD) (Release 7), the whole document.

Samsung, 3GPP TSG RAN WGI Meeting #51, Jeju, Korea, Nov. 5-9, 2007, RI-074793, pp. 1-5.

LG Electronics, 3GPP TSG RAN WG1 Meeting #49bis, Orlando, USA, Jun. 25-29, 2007, R1-073200, pp. 1-5.

3GPP TS 36.212 V2.0.0 (Sep. 2007), 3rd Generation Partnership Project; Technical Specification Group Radio Access Network; Evolved Universal Terrestrial Radio Access (E-UTRA); Multiplexing and channel coding (Release 8), the whole document.

Translation of the Search Report for the Chinese Patent Application No. 200980119923.6, dated Jan. 17, 2013, 2 pages.

3GPP TS 36.212 V8.1.0 (Nov. 2007), $3^{rd}$ Generation Partnership Project; Technical Specification Group Radio Access Network; Evolved Universal Terrestrial Radio Access (E-UTRA); Multiplexing and channel coding (Release 8), the whole document.

Cheng J-F., "Coding performance of hybrid ARQ schemes," *IEEE Transactions on Communications*, Jun. 2006, vol. 54, No. 6, the whole document.

Cheng J-F., "Coding performance of various type-I HARQ schemes with BICM," ISIT 2004, Chicago, USA, Jun. 27-Jul. 2, 2014, p. 319.

Samsung, 3GPP TSG-RAN WG1 #51 bis, Tdoc R1-080045, "Adjustment to starting positions of redundancy versions for turbo code rate matching," Jan. 14-18, 2008, Seville, Spain, the whole document.

\* cited by examiner

SELECTION OF RETRANSMISSION SETTINGS FOR HARQ IN WCDMA AND LTE NETWORKS

RELATED APPLICATION

This application claims the benefit of U.S. Provisional Patent Application 61/038,913 filed Mar. 24, 2008, which is incorporated herein by reference.

BACKGROUND

The present invention relates generally to retransmission protocols for wireless communication systems and, more particularly, to the selection of retransmission parameters for hybrid automatic repeat request operations in wireless communication systems.

The High Speed Downlink Packet Access for Wideband Code Division Multiple Access (WCDMA) and Long Term Evolution (LTE) networks use Hybrid Automatic Repeat Request (HARQ) at the physical layer to mitigate errors that occur during transmission of data. In HARQ, error detection bits or check bits are added to information bits to be transmitted. The information bits with the added error detection bits are then coded using a forward error correction code and transmitted to the receiver. The receiver decodes the received bits and uses the error detection bits to check for uncorrected errors. If the received data block is not correctly decoded, the receiver can request a retransmission by sending a negative acknowledgement (NACK) to the transmitter over a reverse control channel, For type-I HARQ, the retransmission comprises the same bits sent in the initial transmission. For type-II HARQ, sometimes referred to as HARQ with incremental redundancy, the coded bits for each retransmission differ from the coded bits sent in the initial transmission.

In LTE systems, the information bits with added error detection bits are coded by a turbo coder to generate a block of coded bits. The coded bits in the code block are interleaved and input to a circular buffer. To support HARQ operations, four redundancy versions (RVs) are defined. Each redundancy version is associated with a different RV starting point in the circular buffer. During an initial transmission or retransmission, bits are read out of the circular buffer beginning with the RV starting point corresponding with the selected redundancy version. The number of bits read out determines the effective code rate. For purposes of this application, the redundancy versions are designated as RV0, RV1, RV2, and RV3, and it is assumed that RV0, which contains most of the systematic bits, is used for the initial transmission in HARQ operations.

Because of the simplicity and regularity of the circular buffer employed by the channel coder in LTE systems, it is relatively easy to select the redundancy version for a retransmission that provides the greatest incremental redundancy gains. When RV0 is transmitted during an initial transmission, RV2 provides the greatest incremental redundancy gains for quadrature phase shift keying (QPSK) and other modulation schemes in which the bit reliability is the same for all bits in a modulation symbol. For this reason, the LTE standard currently specifies a fixed retransmission strategy for the non-adaptive HARQ mode of PUSCH wherein RV2 is specified for retransmission when RV0 is used for the initial transmission.

Optimization of the HARQ operation is more difficult, however, for higher order modulation schemes, such as 16QAM and 64QAM, where the bits in a QAM symbol fall into different reliability classes. In this case, choosing the redundancy version for a retransmission that provides the greatest incremental redundancy gain may not necessarily result in the best performance. For example, it was observed in simulations that RV3 provides greater improvement in performance over RV2 when RV0 is transmitted in the initial transmission for some selected code rates. Accordingly, there is a need for further improvement in the optimization of retransmission settings for HARQ operations.

SUMMARY

The present invention relates to a method and apparatus for implementing a retransmission protocol by a wireless communication device. More specifically, the present invention relates to a method of selecting retransmission settings for type-II HARQ. The wireless communication device codes an input bit stream to generate a block of coded bits for transmission to a receiver. During coding, filler bits may be added to the input bit stream for channel coding. The number of filler bits F is determined and stored for later use in selecting retransmission settings. After coding, the coded bits are interleaved. Dummy bits may be added to the coded bits for interleaving. The number of added dummy bits $N_D$ is determined and stored for use in selecting retransmission settings.

After coding and interleaving, a first set of coded bits is transmitted during an initial transmission. One or more retransmission parameters are selected based on the number of filler bits F added for coding and the number of dummy bits $N_D$ added for interleaving. The retransmission parameters may, for example, comprise the RV setting for the retransmission and/or an address offset to the RV starting point for a selected RV setting. If a retransmission is requested by the receiver, a second set of coded bits selected based on the retransmission parameters are transmitted to the receiver.

In one exemplary embodiment, an optimal RV setting for the retransmission is selected based on the number of filler bits F and the number of dummy bits $N_D$. The selection of the retransmission settings may be further based on the initial code rate used during the initial transmission. In another exemplary embodiment, the selection of retransmission parameters for the retransmission comprises selection of an address offset to the RV starting point for a selected RV setting.

DETAILED DESCRIPTION

Figure 1:
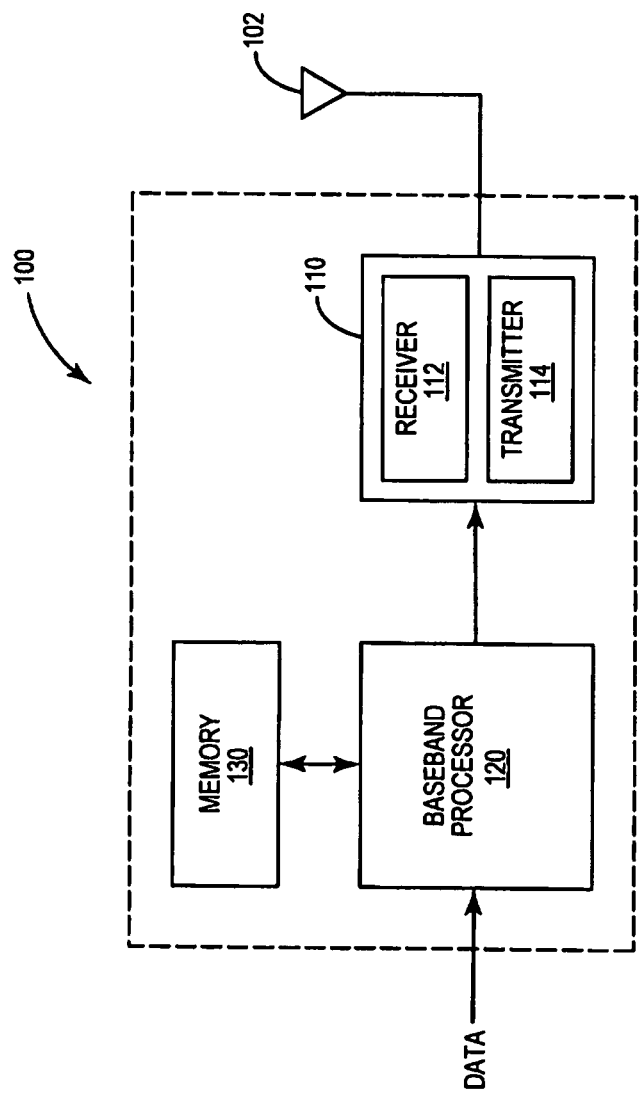
FIG. 1 illustrates an exemplary wireless communication device.

Referring now to the drawings, FIG. 1 illustrates an exemplary wireless communication terminal indicated generally by the numeral 100, which may comprise, for example, a user terminal or a base station in a mobile communication network. The wireless communication terminal 100 may operate according to any communication now known or later developed. For illustrative purposes, the disclosed embodiment operates according to the LTE standard.

Wireless communication terminal 100 comprises transceiver circuits 110 coupled to an antenna 102 for transmitting and receiving signals, and a baseband processing circuit 120 for processing signals transmitted and received by the wireless communication terminal 100. Although only one antenna 102 is shown, those skilled in the art will appreciate that the wireless communication terminal 100 may have multiple antennas 102 for both transmission and reception.

The transceiver circuits 110 include a receiver 112 and a transmitter 114. To briefly summarize, the receiver 112 filters, amplifies, and downconverts received signals to baseband frequency. The baseband signals are converted into digital signals for input to the baseband processor 120. The transmitter 114 converts transmit signals output by the baseband processor 120 into analog signals, which are then upconverted, filtered, and amplified for transmission via antenna 102.

The baseband processor 120, as previously noted, processes the signals transmitted from and received by the wireless communication terminal 100. Such processing includes, for example, modulation/demodulation, channel coding/decoding, source coding/decoding. Baseband processor 120 may comprise one or more processors, microcontrollers, hardware circuits, or a combination thereof. Program instructions to control the operation of the baseband processor 120 as hereinafter described may be stored in a computer readable memory, such as a random access memory (RAM), read-only member (ROM), flash memory, or other memory device 130.

Figure 2:
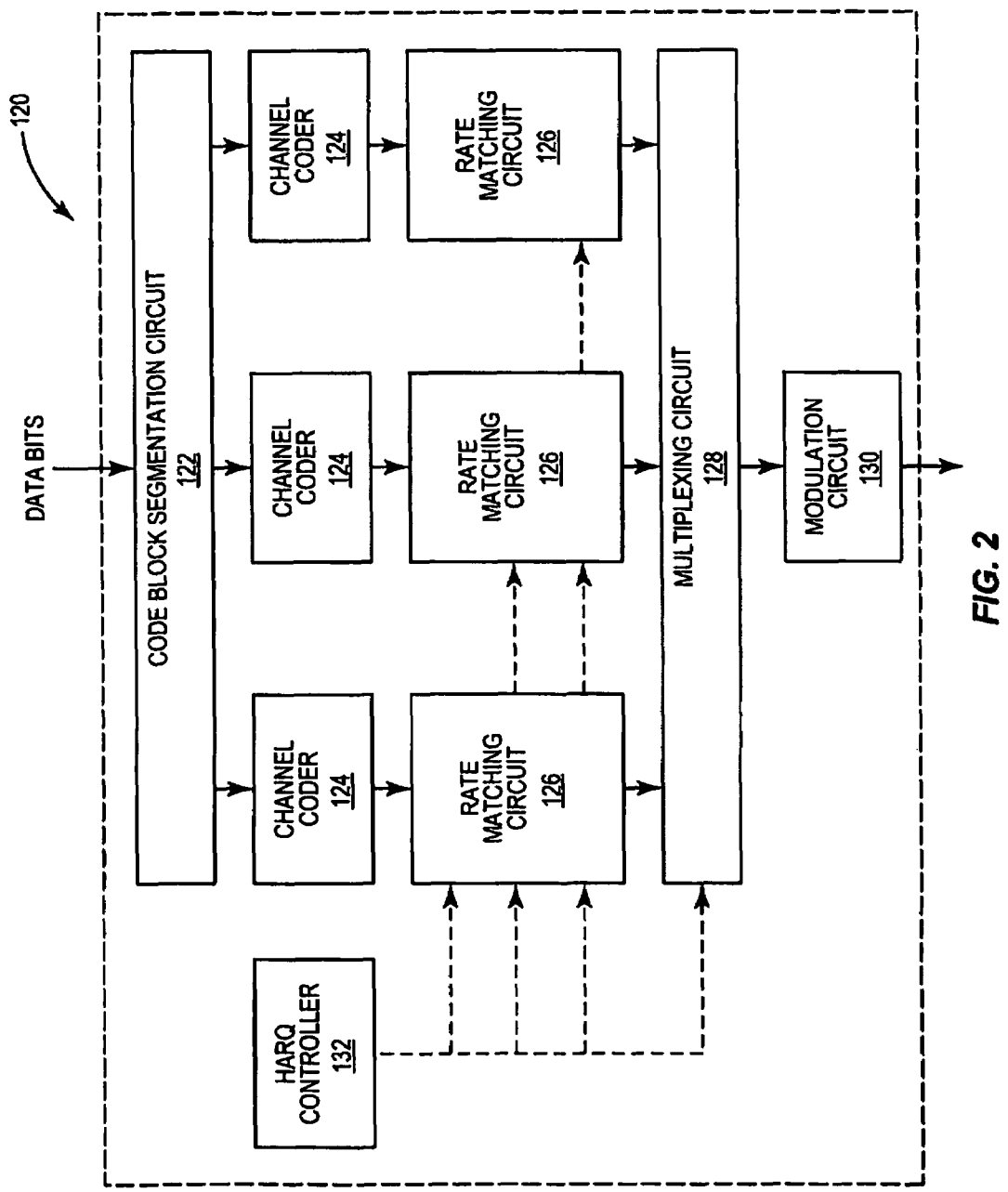
FIG. 2 illustrates the main components of a baseband processor involved in physical layer processing according to one exemplary embodiment.

FIG. 2 illustrates exemplary components of the baseband processor 120 used for physical layer processing of signals transmitted by the wireless communication device 100. During a Transmission Time Interval (TTI), the Medium Access Control (MAC) layer outputs one or more transport blocks to the physical layer for transmission to a receiving terminal. The main components of the baseband processor 120 for physical layer processing include a code block segmentation and CRC attachment circuit 122, channel coding circuits, e.g., turbo coders 124, rate matching circuits 126, a multiplexer circuit 128, a modulation circuit 130, and HARQ controller 132. An input bit sequence is input to the code block segmentation and CRC attachment circuit 122. If the number of bits B is larger than the maximum code block size Z (e.g., 6144 bits in LTE), the segmentation circuit 122 segments the transport block into two or more code blocks and attaches a CRC to each code block. The CRC bits enable the receiver to detect uncorrected errors for HARQ operations as hereinafter described. The number of code blocks is denoted by C and the sizes of the code blocks are denoted by $K_0, K_1, K_2, \ldots K_{C-1}$. Each of the code blocks is encoded by a turbo coder 124 to enable forward error correction at the receiver. The coded bits are then input to a rate matching circuit 126 based on circular buffers. Rate matching circuit 126 punctures or repeats coded bits to generate a specified number of bits needed to match the available channel resources. The number of coded bits output by the rate matching circuit 126 is dependent upon the number of assigned resource blocks, the selected modulation scheme, and the spatial multiplexing order. The bits output by the rate matching circuits 126 are multiplexed by multiplexing circuit 128 and input to the modulation circuit 130. Modulation circuit 130 maps the coded bits output from the rate matching circuit 126 to corresponding modulation symbols in a modulation constellation. The modulation schemes supported by LTE include 16 QPSK, 16 QAM, and 64 QAM. HARQ controller 132 provides logical control for HARQ operations as hereinafter described.

Figure 3:
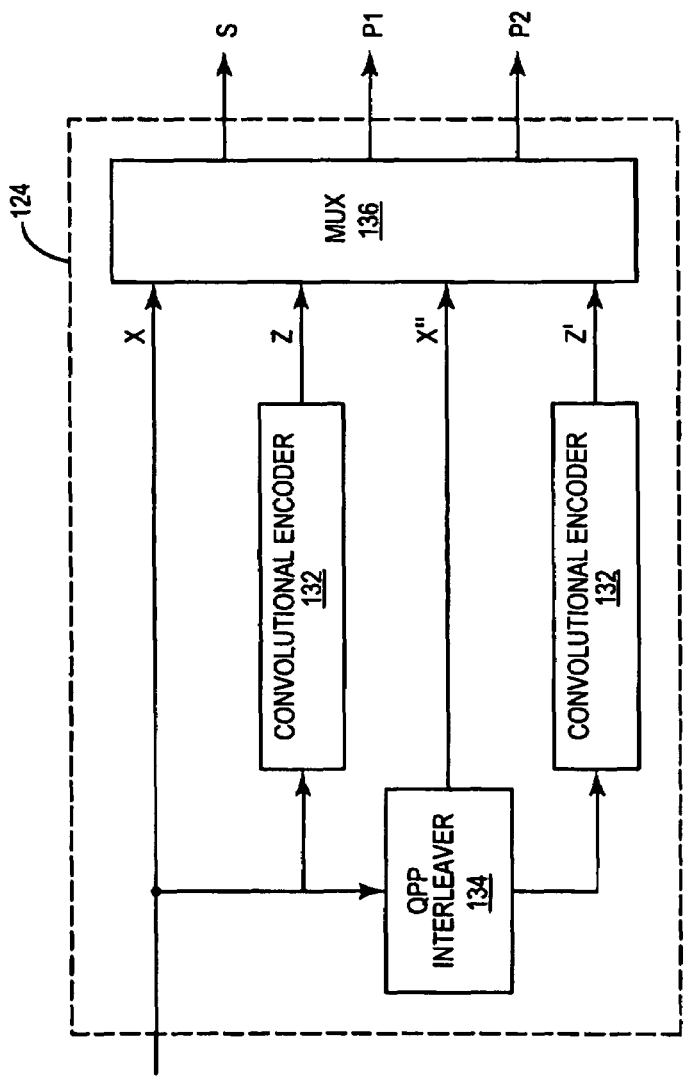
FIG. 3 illustrates an exemplary turbo coder according to one exemplary embodiment.

FIG. 3 illustrates the basic structure of an exemplary turbo coder 124. The LTE turbo code is a parallel concatenated convolutional code using two constituent convolutional encoders 132, an internal interleaver 134, and multiplexer 136. In LTE, interleaver 134 comprises a quadrature permutation polynomial (QPP) interleaver having a length ranging from 40 bits to 6144 bits. In some circumstances, filler bits may be added to the beginning of a transport block so that the size of the code blocks output to the turbo coder 124 is matched to the size of the QPP interleaver 134 in the turbo coder 124. The number of filler bits added is denoted by F. When filler bits are used, the filler bits are added only to the first code block. For a code block of K bits, the turbo coder 124 outputs three streams, referred to herein as the systematic stream S, the first parity stream P1, and the second parity stream P2. Each of these streams is K+4 bits in length.

Figure 4:
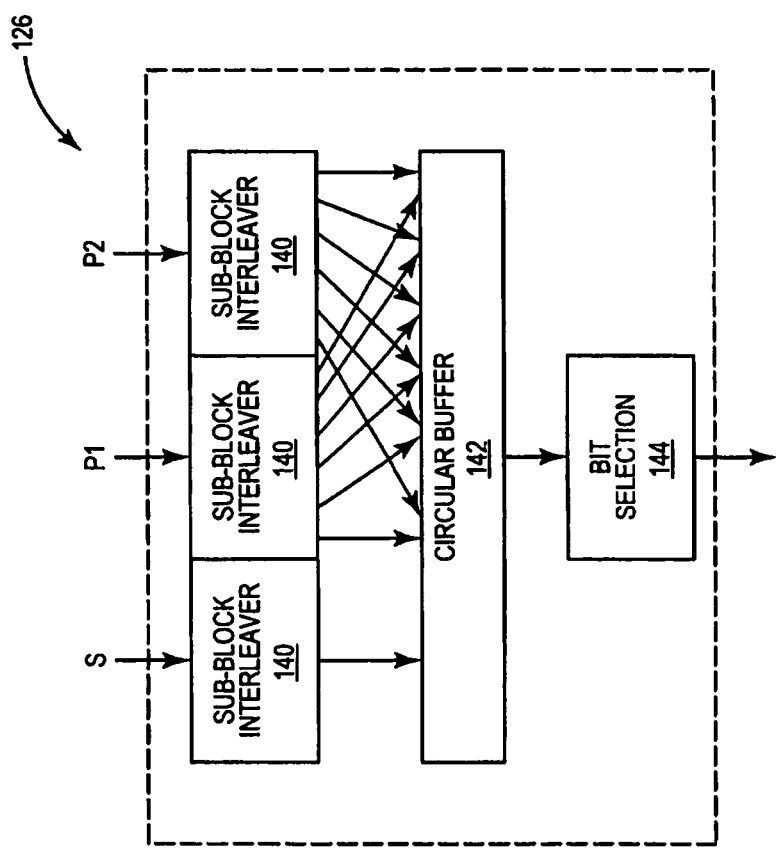
FIG. 4 illustrates an exemplary rate matching circuit according to one exemplary embodiment.

The rate matching circuit 126, shown in more detail in FIG. 4, includes a sub-block interleaver 140 to rearrange the bits in each of the three streams output by the turbo coder 124. The sub-block interleavers 140 of the rate matching circuit 126 have a fixed column width of 32 bits. Therefore, if the bit length of the coded bit streams is not a multiple of 32, dummy bits are added to the coded bit streams to match the lengths of the streams to the widths of the sub-block interleavers 140. The number of added dummy bits $N_D$ can be calculated according to:

$$N_D = 32 - \text{mod}(K+4, 32), \qquad \text{EQ. 1}$$

where mod(•) represents the modulo function. After interleaving, the coded bits are input to a circular buffer 142, with the S bits disposed in the front of the buffer 142 followed by the P1 and P2 bits. A bit selection circuit 144, controlled by the HARQ controller 132, reads coded bits out of the circular buffer 142. In the case of a retransmission, the HARQ controller 132 will, generally, select a different set of code bits to be transmitted to provide incremental redundancy.

Figure 5:
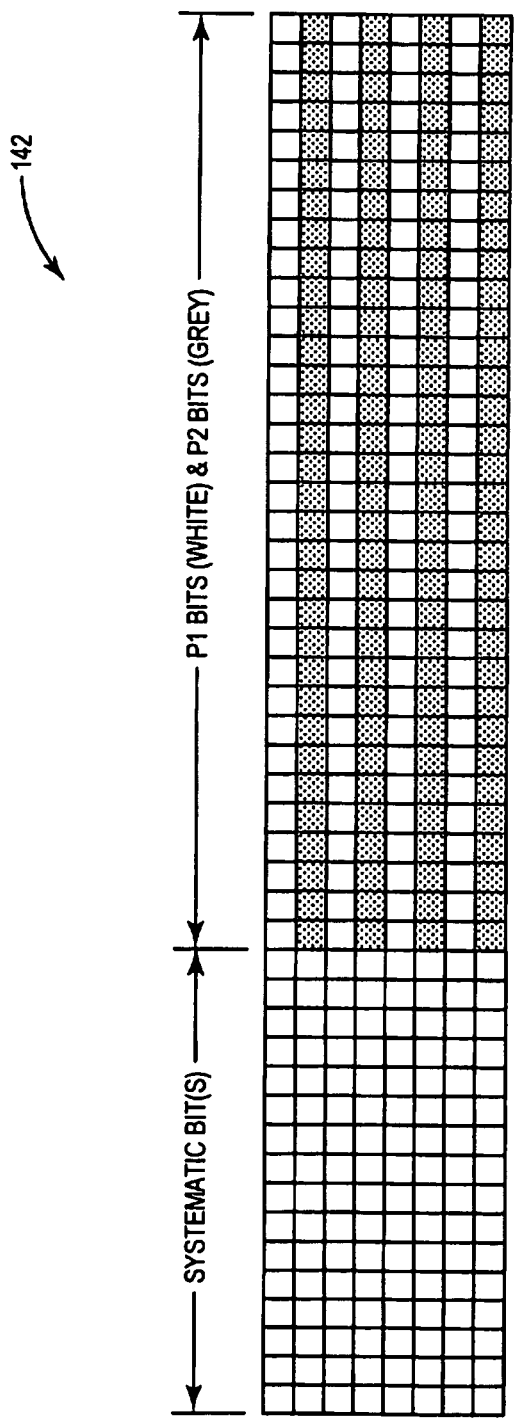
FIG. 5 illustrates a circular buffer for a rate matching in one exemplary embodiment.

The circular buffer 142 can be conceptually represented by a two dimensional matrix as shown in FIG. 5. The first 32 columns represent the 32 columns of the S bits after interleaving. The last 64 columns represent bit-by-bit interlaced columns of P1 and P2 bits. When bits are read out of circular buffer 142, both filler bits and dummy bits are discarded. Thus, the real effective length of the circular buffer 142 corresponding to a code block of size K and the number of filler bits F is given by:

$$CBL = 3 \times K + 12 - 2 \times F. \qquad \text{EQ. 2}$$

In a system with Hybrid Automatic Repeat Request (HARQ), error detection bits or check bits are added to information bits to be transmitted. The information bits with the added error detection bits are then coded using a forward error correction code and transmitted to the receiver. The receiver decodes the received bits and uses the error detection bits to check for uncorrected errors. If the received data block is not correctly decoded, the receiver can request a retransmission by sending a negative acknowledgement (NACK) to the transmitter over a reverse control channel. Traditionally, two distinctive HARQ modes are defined. For type-I HARQ, the retransmission comprises the same bits sent in the initial transmission. In type-II HARQ, sometimes referred to as HARQ with incremental redundancy, the coded bits for each retransmission differ from the coded bits sent in the initial transmission. In the LTE standard, these two modes or a combination of them can be implemented by selecting a different RV for retransmissions.

To support efficient HARQ operations, four Redundancy Versions (RVs) of the coded bits output by the turbo coder 124 are defined. The RV settings are denoted herein as RV0, RV1, RV2, and RV3. Each RV setting is associated with a different RV starting point. To obtain a desired code rate with a particular RV setting, a desired number of data bits are read out of the circular buffer 142 beginning with the RV starting point for the selected RV. If the end of the circular buffer 142 is reached, the reading continues by wrapping around to the beginning of the buffer 142. Thus, puncturing and repetition can be achieved using a unified method.

Because the S bits are located at the front of the circular buffer 142, it is typical to select RV0 for the initial transmission. To implement type-I HARQ, the same RV0 can be selected for retransmission. To implement type-II HARQ, different RV settings are used for the initial transmission and retransmission to provide Incremental Redundancy (IR). One strategy for optimizing HARQ operations when QPSK modulation is used, is to select a RV setting for the first retransmission that provides the greatest incremental redundancy gain, i.e., the greatest number of new bits. Table 1 below shows the percentage of repetition bits for different retransmission RV settings, assuming that the initial transmission uses RV0. As shown in Table 1, RV2 has fewer repetition bits and, thus, a larger incremental redundancy gain than RV1 and RV3.

TABLE 1

Percentage of repetition bits for different initial code rate and different retransmission RV settings (RV0 is assumed for the initial transmission).

| Initial code rate | Percentage of Repetition Bits | | | |
|---|---|---|---|---|
| | RV0 | RV1 | RV2 | RV3 |
| 0.97 | 100% | 27% | 0% | 27% |
| 0.91 | 100% | 31% | 0% | 31% |
| 0.86 | 100% | 35% | 0% | 35% |
| 0.82 | 100% | 38% | 0% | 38% |
| 0.78 | 100% | 41% | 0% | 41% |
| 0.74 | 100% | 44% | 0% | 44% |
| 0.71 | 100% | 47% | 0% | 47% |
| 0.68 | 100% | 49% | 0% | 49% |
| 0.65 | 100% | 51% | 4% | 51% |
| 0.63 | 100% | 53% | 12% | 53% |
| 0.60 | 100% | 55% | 19% | 55% |
| 0.58 | 100% | 56% | 25% | 56% |
| 0.56 | 100% | 58% | 32% | 58% |
| 0.54 | 100% | 59% | 37% | 59% |
| 0.52 | 100% | 61% | 43% | 61% |
| 0.51 | 100% | 62% | 48% | 62% |
| 0.49 | 100% | 63% | 52% | 63% |
| 0.48 | 100% | 64% | 57% | 64% |
| 0.46 | 100% | 65% | 61% | 65% |
| 0.45 | 100% | 66% | 65% | 66% |
| 0.44 | 100% | 68% | 68% | 68% |
| 0.43 | 100% | 72% | 72% | 72% |
| 0.41 | 100% | 78% | 78% | 78% |
| 0.39 | 100% | 84% | 84% | 84% |
| 0.37 | 100% | 90% | 90% | 90% |
| 0.35 | 100% | 95% | 95% | 95% |
| 0.33 | 100% | 100% | 100% | 100% |

Figure 6:
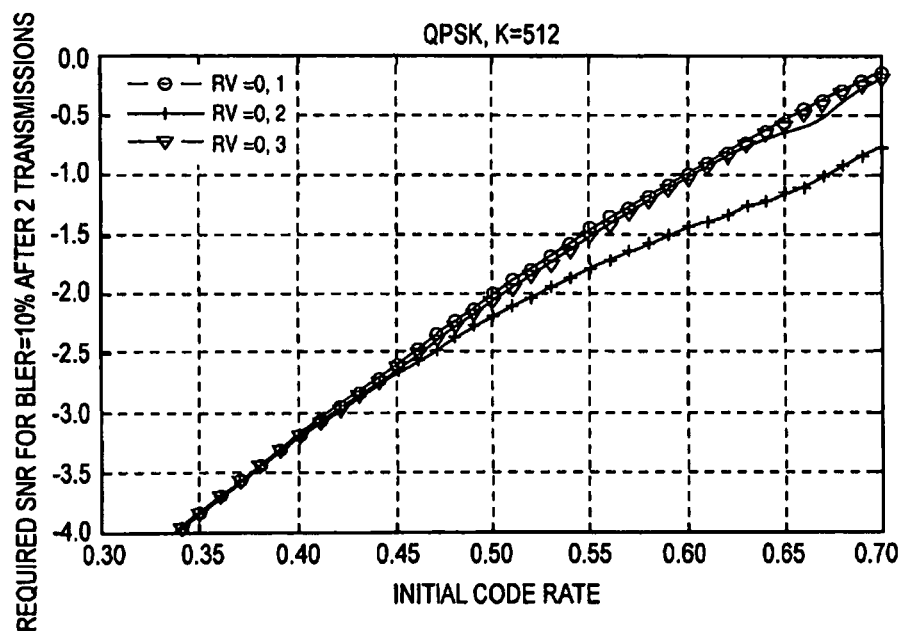
FIG. 6 illustrates the relative performance of different retransmission RV settings for QPSK modulation.

FIG. 6 shows the simulated relative performance of QPSK after two transmissions using different initial code rates and RV settings for the two transmissions. For the simulation, it was assumed that the code block size was 512 bits. In FIG. 6, the signal-to-noise ratio required for a block error rate (BLER) of 10% is plotted against the initial code rate. The graph shown in FIG. 6 shows that for code rates higher than 0.45, retransmissions based on RV2 require lower SNR than retransmissions based on RV1 and RV3 to obtain a 10% BLER. For code rates lower than 0.45, retransmissions based on RV1, RV2, and RV3 achieve essentially identical performance. Because RV2 provides improved performance at code rates above 0.45, and equivalent performance at code rates less than 0.45, the LTE standard specifies a fixed retransmission strategy for the non-adaptive HARQ mode of PUSCH wherein RV2 is used for the first retransmission when RV0 is used for the initial transmission.

Figure 7:
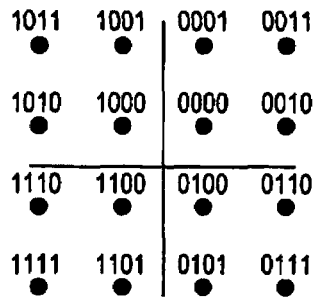
FIG. 7 illustrates an exemplary 16QAM modulation constellation.

While the fixed retransmission strategy specified by the LTE standard works well for QPSK, HARQ optimization is more complicated for higher order modulation schemes, such as 16 QAM and 64 QAM. In these higher order modulation schemes, the bits in a QAM symbol fall into different reliability classes. An exemplary 16 QAM constellation is shown in FIG. 7. In 16 QAM, the first two bits determine the quadrant in which the modulation symbol is located, while the second two bits determine which point in the quadrant is selected. As a result, the four bits in a QAM symbol belong to two different reliability classes, with the first two bits exhibiting higher reliability than the second two bits. Similarly, the bits in a 64 QAM symbol belong to three reliability classes with the first two bits exhibiting higher reliability than the middle two bits, which in turn exhibit higher reliability than the last two bits. For HARQ operations, bit reliability equalization gains can be achieved if the repeated bits in a retransmission are transmitted in a different reliability class than the initial transmission. That is, bit reliability equalization gains can be achieved if the bits mapped to the higher reliability class in the initial transmission are mapped to the lower reliability class in the retransmission, and vice versa.

In LTE, bits read out from the circular buffer 142 are mapped to the modulation constellation without rearrangement by a separate channel interleaver. Consequently, the positions of the retransmitted bits are very regular and can be predicted. The transport block sizes in LTE, the code block length K, and the number of filler bits F are all multiples of 8. Thus, the size of the circular buffer 142 in LTE is always divisible by 4. When 16 QAM is used in both the initial transmission and the retransmission, bits will be repeated in the same reliability class if the RV starting point of the two RV settings differ by a multiple of 4. Similarly, when the circular buffer 142 size is a multiple of 6 (e.g., when F=0, 24, or 48) bits in the 64 QAM, modulations will be repeated in the same reliability class if the starting points of the two RV settings differ by a multiple of 6.

In some operating conditions, repeating bits during a retransmission in the same reliability class as the initial transmission can lead to degradation in performance. As an example, consider a code block of size K=488 modulated using 64 QAM. The starting addresses for RV0 and RV2 are 30 and 768, respectively. Because the two starting points differ by a multiple of 6, any bit that is repeated in retransmission will be mapped to the same reliability class as the initial transmission. On the other hand, the starting addresses of RV1 and RV2 are 399 and 1136, respectively. Because the distance between the starting point of either RV1 or RV3 and RV0 is not a multiple of 6, repeated bits can be transmitted in different reliability classes during the retransmission.

Figure 8:
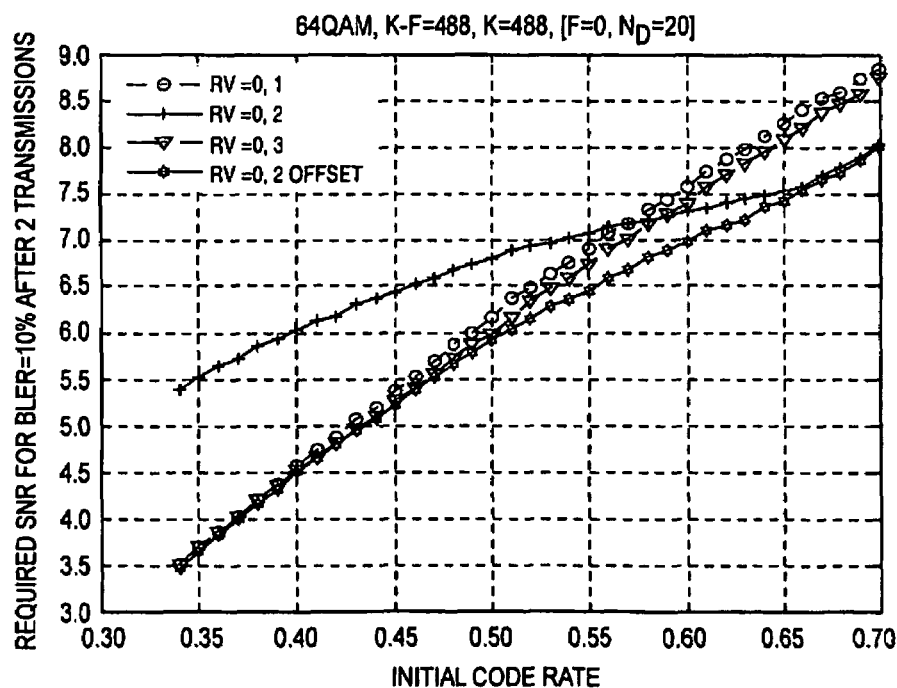
FIG. 8 illustrates the relative performance of different retransmission RV settings for 16QAM modulation.

FIG. 8 illustrates the relative performance of RV1, RV2, and RV3 settings for retransmission when the initial transmission uses RV0. The graph shows the required SNR for a BLER of 10% after two transmissions for different initial code rates. The graph shows that the RV3 is better for retransmission when the initial code rate is lower than 0.58 and that the RV2 is better when the initial code rate is higher. The improved performance of RV3 for retransmission at code rates lower than 0.58 is due to the bit reliability equalization gains of RV3. At code rates lower than 0.58, the bit equalization reliability gains of RV3 outweigh the incremental redundancy gains of RV2 for retransmission.

Improvements in the performance of HARQ operation can be achieved by considering two channel coding parameters, the number of filler bits F, and the number of dummy bits $N_D$ in the selection of the retransmission settings for HARQ operation. The set of possible code blocks can be classified into twelve possible types based on these channel coding factors. In one exemplary embodiment of the invention, the RV setting for the first retransmission is selected based on the code block classification, which depends on the number of filler bits F and the number of dummy bits $N_D$. In this embodiment, selection of the RV setting for the first retransmission may also take into account the initial code rate. In a second exemplary embodiment, the code block classification, which depends on the number of filler bits F and the number of dummy bits $N_D$, is used to select an address offset for the first retransmission. In this embodiment, it is presumed that RV2 is used for the first retransmission. The address offset is added to the RV2 starting point to shift the RV2 starting point. Shifting the RV2 starting point ensures that repeated bits in the retransmission will be mapped to a different reliability class than the same bits in the initial transmission for both 16 QAM and 64 QAM.

Some examples will help in understanding the process of selecting the optimal retransmission setting. The following examples assume a code block size K=40 bits using 64 QAM modulation and RV0 for the initial transmission. Since K is a QPP interleaver size in LTE, no filler bits are added to the data bits in this particular example. The systematic bits S output by the turbo coder 124 are indexed as bits 0, 1, 2, . . . 43, the P1 bits are indexed as bits 44, 45, . . . 87 and the P2 bits are indexed as bits 88, 89, 90, . . . 131. After discarding the dummy bits, the circular buffer length (CBL) is 132 bits, which is a multiple of 6. The four RV starting points in the circular buffer 142 are 2, 35, 68, and 100. Table 2 shows the bit composition of the 22 64 QAM symbols. As shown in Table 2, the first 64 QAM symbol is defined by the coded bits 20, 4, 36, 16, 0, and 32. Bits 20 and 4 have high reliability, bits 36 and 16 have medium reliability, and bits 0 and 32 have the low reliability. Similarly, for symbol 11, it can be observed that bits 74 and 119 have high reliability, bits 66 and 111 have medium reliability, and bits 50 and 95 have low reliability.

TABLE 2

Bit composition of 64 QAM for RV0 with K = 40

| Symbol | b0 | b1 | b2 | b3 | b4 | b5 |
|---|---|---|---|---|---|---|
| 0 | 20 | 4 | 36 | 16 | 0 | 32 |
| 1 | 24 | 8 | 40 | 14 | 30 | 22 |
| 2 | 6 | 38 | 18 | 2 | 34 | 26 |
| 3 | 10 | 42 | 13 | 29 | 21 | 5 |
| 4 | 37 | 17 | 1 | 33 | 25 | 9 |
| 5 | 41 | 15 | 31 | 23 | 7 | 39 |
| 6 | 19 | 3 | 35 | 27 | 11 | 43 |
| 7 | 56 | 101 | 72 | 117 | 64 | 109 |
| 8 | 48 | 93 | 80 | 125 | 60 | 105 |
| 9 | 44 | 89 | 76 | 121 | 68 | 113 |
| 10 | 52 | 97 | 84 | 129 | 58 | 103 |

TABLE 2-continued

Bit composition of 64 QAM for RV0 with K = 40

| Symbol | b0 | b1 | b2 | b3 | b4 | b5 |
|---|---|---|---|---|---|---|
| 11 | 74 | 119 | 66 | 111 | 50 | 95 |
| 12 | 82 | 127 | 62 | 107 | 46 | 91 |
| 13 | 78 | 123 | 70 | 115 | 54 | 99 |
| 14 | 86 | 131 | 57 | 102 | 73 | 118 |
| 15 | 65 | 110 | 49 | 94 | 81 | 126 |
| 16 | 61 | 106 | 45 | 90 | 77 | 122 |
| 17 | 69 | 114 | 53 | 98 | 85 | 130 |
| 18 | 59 | 104 | 88 | 75 | 120 | 67 |
| 19 | 112 | 51 | 96 | 83 | 128 | 63 |
| 20 | 108 | 47 | 92 | 79 | 124 | 71 |
| 21 | 116 | 55 | 100 | 87 | 12 | 28 |
| Reliability | H | H | M | M | L | L |

Table 3 illustrates the bit composition of the 64 QAM symbols for the RV2 setting. It can be observed that the coded bits are mapped to the same reliability classes for both the RV0 and RV2 settings. Thus, the reliability variation among the repeated bits will not be equalized if the RV2 setting is used for retransmission. This property can be easily confirmed by computing the distance between the RV0 and RV2 starting points modulo 6, i.e., mod(68-2, 6)=0.

TABLE 3

Bit Composition of 64 QAM for RV2 with K = 40

| Symbol | b0 | b1 | b2 | b3 | b4 | b5 |
|---|---|---|---|---|---|---|
| 0 | 74 | 119 | 66 | 111 | 50 | 95 |
| 1 | 82 | 127 | 62 | 107 | 46 | 91 |
| 2 | 78 | 123 | 70 | 115 | 54 | 99 |
| 3 | 86 | 131 | 57 | 102 | 73 | 118 |
| 4 | 65 | 110 | 49 | 94 | 81 | 126 |
| 5 | 61 | 106 | 45 | 90 | 77 | 122 |
| 6 | 69 | 114 | 53 | 98 | 85 | 130 |
| 7 | 59 | 104 | 88 | 75 | 120 | 67 |
| 8 | 112 | 51 | 96 | 83 | 128 | 63 |
| 9 | 108 | 47 | 92 | 79 | 124 | 71 |
| 10 | 116 | 55 | 100 | 87 | 12 | 28 |
| 11 | 20 | 4 | 36 | 16 | 0 | 32 |
| 12 | 24 | 8 | 40 | 14 | 30 | 22 |
| 13 | 6 | 38 | 18 | 2 | 34 | 26 |
| 14 | 10 | 42 | 13 | 29 | 21 | 5 |
| 15 | 37 | 17 | 1 | 33 | 25 | 9 |
| 16 | 41 | 15 | 31 | 23 | 7 | 39 |
| 17 | 19 | 3 | 35 | 27 | 11 | 43 |
| 18 | 56 | 101 | 72 | 117 | 64 | 109 |
| 19 | 48 | 93 | 80 | 125 | 60 | 105 |
| 20 | 44 | 89 | 76 | 121 | 68 | 113 |
| 21 | 52 | 97 | 84 | 129 | 58 | 103 |
| Reliability | H | H | M | M | L | L |

Table 4 illustrates the bit composition of the 64 QAM symbols for the RV3 setting. It can be observed that the bits mapped to the high reliability class in RV0 are mapped to the lower reliability class in RV3. Bits of medium reliability in RV0 are mapped to the higher reliability class in RV3. Also, bits in the low reliability class in RV0 are mapped to the medium reliability class in RV3. Hence, reliability variation among the repeated bits are equalized if the RV3 setting is used for retransmission. Similarly, the back portion of bits in the QAM symbol are mapped to different reliability classes. This property can be easily checked by computing the distance between RV0 and RV3 starting points modulo 6, i.e., mod(100-2, 6)=2.

TABLE 4

Bit Composition of 64 QAM for RV3 with K = 40

| Symbol | b0 | b1 | b2 | b3 | b4 | b5 |
|---|---|---|---|---|---|---|
| 0 | 45 | 90 | 77 | 122 | 69 | 114 |
| 1 | 53 | 98 | 85 | 130 | 59 | 104 |
| 2 | 88 | 75 | 120 | 67 | 112 | 51 |
| 3 | 96 | 83 | 128 | 63 | 108 | 47 |
| 4 | 92 | 79 | 124 | 71 | 116 | 55 |
| 5 | 100 | 87 | 12 | 28 | 20 | 4 |
| 6 | 36 | 16 | 0 | 32 | 24 | 8 |
| 7 | 40 | 14 | 30 | 22 | 6 | 38 |
| 8 | 18 | 2 | 34 | 26 | 10 | 42 |
| 9 | 13 | 29 | 21 | 5 | 37 | 17 |
| 10 | 1 | 33 | 25 | 9 | 41 | 15 |
| 11 | 31 | 23 | 7 | 39 | 19 | 3 |
| 12 | 35 | 27 | 11 | 43 | 56 | 101 |
| 13 | 72 | 117 | 64 | 109 | 48 | 93 |
| 14 | 80 | 125 | 60 | 105 | 44 | 89 |
| 15 | 76 | 121 | 68 | 113 | 52 | 97 |
| 16 | 84 | 129 | 58 | 103 | 74 | 119 |
| 17 | 66 | 111 | 50 | 95 | 82 | 127 |
| 18 | 62 | 107 | 46 | 91 | 78 | 123 |
| 19 | 70 | 115 | 54 | 99 | 86 | 131 |
| 20 | 57 | 102 | 73 | 118 | 65 | 110 |
| 21 | 49 | 94 | 81 | 126 | 61 | 106 |
| Reliability | H | H | M | M | L | L |

Tables 2-4 indicate that the RV3 setting is preferred over the RV2 setting for retransmission from the standpoint of equalizing bit reliability. However, the number of repetition bits are lower for retransmission with RV2, which results in greater incremental redundancy gains. Thus, the optimal retransmission RV setting should strike a balance between the gains of bit reliability equalization and incremental redundancy.

Based on a systematic analysis of the behaviors of all code blocks, the code blocks may be classified into twelve different code block types. Code blocks belonging to the same code block type exhibit similar behavior and performance. Because the transport block sizes in LTE are multiples of 8, there are 764 possible code blocks. The classification of the code block is based on the number of filler bits F used in channel coding and the number of dummy bits $N_D$ used in rate matching. The number of dummy bits $N_D$ can be calculated according to EQ. 1. As noted previously, filler bits are added only to the first code block in cases where the transport block is segmented into multiple code blocks. This implies that different code blocks in the same transport block may be differently classified. Definitions of the twelve code block types are given in Table 5.

TABLE 5

Classification of all 764 possible code blocks

| Code Block Type | # of filler bits F | # of dummy bits $N_D$ | # of code blocks of this type | Example |
|---|---|---|---|---|
| 1 | 0 | 4 | 15 | K − F = 504, K = 504 |
| 2 | 0 | 12 | 31 | K − F = 496, K = 496 |
| 3 | 0 | 20 | 15 | K − F = 488, K = 488 |
| 4 | 0 | 28 | 127 | K − F = 512, K = 512 |
| 5 | 8 | 12 | 16 | K − F = 520, K = 528 |
| 6 | 8 | 28 | 112 | K − F = 536, K = 544 |
| 7 | 16 | 28 | 96 | K − F = 1040, K = 1056 |
| 8 | 24 | 28 | 96 | K − F = 1032, K = 1056 |
| 9 | 32 | 28 | 64 | K − F = 2080, K = 2112 |
| 10 | 40 | 28 | 64 | K − F = 2072, K = 2112 |
| 11 | 48 | 28 | 64 | K − F = 2064, K = 2112 |
| 12 | 56 | 28 | 64 | K − F = 2056, K = 2112 |

Table 6 summarizes the RV behavior for 16 QAM modulation from the standpoint of bit reliability equalization. Table 6 gives the modulo 4 distance of the RV1, RV2, and RV3 starting points from the RV1 starting point for all twelve code block types. For a type 3 code block (e.g., F=0 and $N_D$=20), it can be seen that the distance between the RV2 or RV3 starting point and the RV0 starting point modulo 4 is 2. Thus, bits that are originally transmitted in the $b_0$ and $b_1$ positions of a 16 QAM symbol will be repeated on the $b_2$ and $b_3$ positions, and vise versa. Since the $b_0$ and $b_1$ positions exhibit higher transmission reliability than the $b_2$ and $b_3$ positions, it can be presumed that RV2 and of type-3 code blocks provide bit reliability equalization gains. Using a similar analysis, it can be concluded that RV1 for type-3 code blocks provides a reduced bit reliability equalization gain since only half of the repeated bits are mapped to different reliability classes. As noted previously, RV2 provides the greatest incremental redundancy gains. Thus, RV2 and RV3 provide the same bit equalization gain, while provides greater incremental redundancy gain. Therefore, the optimal retransmission RV setting for type-3 code blocks is RV2 for both high initial code rates and low initial code rates.

TABLE 6

RV behaviour with respect to 16 QAM modulation.

| | | | Starting distance to RV = 0 modulo 4 | | |
|---|---|---|---|---|---|
| Type | F | $N_D$ | RV = 1 | RV = 2 | RV = 3 |
| 1 | 0 | 4 | 1 | 1 | 3 |
| 2 | 0 | 12 | 3 | 1 | 3 |
| 3 | 0 | 20 | 1 | 2 | 2 |
| 4 | 0 | 28 | 3 | 2 | 0 |
| 5 | 8 | 12 | 1 | 0 | 3 |
| 6 | 8 | 28 | 1 | 0 | 0 |
| 7 | 16 | 28 | 3 | 2 | 2 |
| 8 | 24 | 28 | 1 | 1 | 2 |
| 9 | 32 | 28 | 3 | 3 | 1 |
| 10 | 40 | 28 | 1 | 1 | 1 |
| 11 | 48 | 28 | 3 | 3 | 3 |
| 12 | 56 | 28 | 1 | 2 | 3 |

Analysis of 64 QAM modulation is more complicated because not all circular buffer lengths are equally divisible by 6. First consider the 6 code block types where the circular buffer 142 links are divisible by 6 (i.e., those corresponding to F=0, 24, 48). For these code block types, it is necessary to consider the distances between the RV0 starting point and the other three RV starting points modulo 6. The computed results for these six code block types are shown in Table 7. For the previously-mentioned type-3 code block, the three entries of "3, 0, 2" provide a quick summary of the bit equalization gains for the different RV settings. That is, bit reliability equalization gains are available with the RV1 and RV3 settings, but absent with the RV2 setting.

TABLE 7

RV behaviour with respect to 64 QAM modulation.

| | | | CBL | Starting distance to RV = 0 modulo 6 | | | | | |
|---|---|---|---|---|---|---|---|---|---|
| | | | modulo | Before Wrap-around | | | After 1st Wrap-around | | |
| Type | F | $N_D$ | 6 | RV = 1 | RV = 2 | RV = 3 | RV = 1 | RV = 2 | RV = 3 |
| 1 | 0 | 4 | 0 | 3 | 5 | 3 | | | |
| 2 | 0 | 12 | 0 | 3 | 5 | 1 | | | |
| 3 | 0 | 20 | 0 | 3 | 0 | 2 | | | |
| 4 | 0 | 28 | 0 | 3 | 0 | 2 | | | |
| 5 | 8 | 12 | 2 | 3 | 2 | 1 | 1 | 0 | 5 |
| 6 | 8 | 28 | 2 | 3 | 2 | 2 | 1 | 0 | 0 |
| 7 | 16 | 28 | 4 | 3 | 4 | 0 | 5 | 0 | 2 |
| 8 | 24 | 28 | 0 | 3 | 1 | 0 | | | |
| 9 | 32 | 28 | 2 | 3 | 3 | 5 | 1 | 1 | 3 |
| 10 | 40 | 28 | 4 | 3 | 5 | 5 | 5 | 1 | 1 |
| 11 | 48 | 28 | 0 | 3 | 1 | 3 | | | |
| 12 | 56 | 28 | 2 | 3 | 4 | 3 | 1 | 2 | 1 |

For the six code block types where the circular buffer lengths are not divisible by 6 (i.e., those corresponding to F=8, 16, 32, 40, 56), the effects of wrapping in the circular buffer 142 should be considered. Consider, for example, code block type 5. The first three entries of "3, 2, 1" before wrapping indicate that the RV1 and RV2 settings provide good bit reliability equalization gains, and that the RV3 setting provides less bit reliability equalization gains. However, because the circular buffer length modulo 6 is 2, all the relative distances between the RV starting points are shifted by 2 after wrap-around. The effect of wrap-around is summarized by the next three entries in Table 7. For lower code rates, where more coded bits are transmitted, the combined effects before and after wrap-around determine the performance of the different RV settings. It can be concluded that RV1 with modulo distance of 3 before wrap-around, and 1 after wrap-around, provides the greatest bit equalization gains among the three RV choices for type 5 code blocks.

An Accumulative Conditional Mutual Information (ACMI) framework provides a systematic method to evaluate the combined effects of incremental redundancy gains and bit reliability equalization gains for different code block types. First, for each coding rate and RV setting, the number of bits that are repeated and the number of bits not repeated can be calculated based on the total number of coded bits and the distance between RV starting points. Second, for those repeated bits, the transmission reliability patterns can be read from Tables 6 and 7. The computed results from the first two steps are then fed into the following ACMI formula:

$$ACMI = \frac{1}{N_{data}} \sum_b N_b \cdot C(b \cdot SNR), \quad \text{EQ. 3}$$

where $N_{data}$ represents the number of total coded bits, $N_b$ represents the number of bits that are repeated b times, $C(\bullet)$ represents the capacity function of the modulation method, and SNR is set to the typical signal-to-noise ratio required for that coding rate. More specifically, values of $N_b$ are determined by the first step. The second step determines the capacity formula to be used.

Based on the assumption that RV0 is used for the initial transmission, Table 8 gives the optimal RV setting for the first retransmission based on code block type, which depends on the channel coding factors as previously described. Table 8 provides two different RV settings for each code block type: one for low initial code rates and one for high initial code rates. A code rate threshold t can be specified for each code block type. Thus, for a given code block type, the optimal RV setting for the retransmission is determined by comparing the code rate of the initial transmission to the code rate threshold t. If the initial code rate is below the code rate threshold t, the RV setting for the low initial code rate is selected. Conversely, if the initial code rate is greater than the code rate threshold t, the RV setting for the high initial code rate case is selected. It can be seen from the tables that the incremental redundancy gains are the dominant factor for high code rate cases, while the bit reliability equation effects are more important for the lower code rate cases. The threshold code rates for selecting the optimal RV are generally different for different code block types and code block lengths. However, the thresholds are generally in the range of 0.52 to 0.57. Hence, for simplified implementation, it is possible to use a single threshold for all code block types and sizes without performance losses.

TABLE 8

Optimal retransmission RV setting for 16 QAM with RV0 for the initial transmission

| | | | Optimal Retransmission RV | |
|---|---|---|---|---|
| Code Block Type | # of filler bits F | # of dummy bits $N_D$ | Low initial code rate case | High initial code rate case |
| 1 | 0 | 4 | 2 | 2 |
| 2 | 0 | 12 | 2 | 2 |
| 3 | 0 | 20 | 2 | 2 |
| 4 | 0 | 28 | 2 | 2 |
| 5 | 8 | 12 | 3 | 2 |
| 6 | 8 | 28 | 1 | 2 |
| 7 | 16 | 28 | 2 | 2 |
| 8 | 24 | 28 | 3 | 2 |
| 9 | 32 | 28 | 2 | 2 |
| 10 | 40 | 28 | 2 | 2 |
| 11 | 48 | 28 | 2 | 2 |
| 12 | 56 | 28 | 2 | 2 |

As an example, the optimal RV setting for a code block of type 5 (e.g., F=8 and $N_D$=12) is RV3 if the initial code rate is lower than the coder rate threshold t, and RV2 if the initial code rate is higher than the code rate threshold t. An exemplary setting for the code rate threshold t is 0.52. However, the code rate threshold t can be set to a different value for each different code block type. The code rate threshold t can also be set to different values for different code block sizes. For a simplified implementation, a single code rate threshold t could be used for all code block types and sizes.

Table 9 gives optimal retransmission RV settings for 64 QAM assuming the initial transmission is made using RV0. For 64 QAM, the optimal retransmission setting for a code block of type 5 (e.g., F=8 and $N_D$=12) is RV1 if the initial code rate is lower than the code rate threshold t, and RV2 if the initial code rate is higher than the code rate threshold t.

TABLE 9

Optimal retransmission RV setting for 64 QAM with RV = 0 for the initial transmission

| Code Block Type | # of filler bits F | # of dummy bits $N_D$ | Optimal Retransmission RV | |
| --- | --- | --- | --- | --- |
| | | | Low initial code rate case | High initial code rate case |
| 1 | 0 | 4 | 3 | 2 |
| 2 | 0 | 12 | 1 | 2 |
| 3 | 0 | 20 | 3 | 2 |
| 4 | 0 | 28 | 3 | 2 |
| 5 | 8 | 12 | 1 | 2 |
| 6 | 8 | 28 | 1 | 2 |
| 7 | 16 | 28 | 3 | 2 |
| 8 | 24 | 28 | 1 | 2 |
| 9 | 32 | 28 | 3 | 2 |
| 10 | 40 | 28 | 1 | 2 |
| 11 | 48 | 28 | 3 | 2 |
| 12 | 56 | 28 | 2 | 2 |

Note that large transport blocks may be segmented to create than one code block. Since the channel coding in LTE is designed such that filler bits, if needed, will be present only in the first code block, segmentation of the transport block will lead to situations where the first code block is of a different code block type than the other code blocks. This situation may be avoided by designing large transport blocks such that no filler bits are needed. Note also that, if the retransmission uses a different modulation than that for the previous transmission, bits will not be mapped identical reliability classes. Hence, bit reliability equalization gains can also be captured by switching modulations in retransmissions.

In another embodiment of the present invention, the code block classification based on the number of filler bits F and the number of dummy bits $N_D$ is used to design optimal starting address offsets for RV2. The single offset for each code block type optimizes the performance of 16 QAM and 64 QAM retransmissions jointly. More particularly, an offset to the RV2 starting address is selected for each code block type such that the modulo distance between the new starting point and that for RV0 becomes 2 for the 16 QAM case and 2, 3, or 4 for the 64 QAM case. Such net modulo distances maximize the bit reliability equalization gains for the two QAM modulations, while maintaining the incremental redundancy gains inherent in the RV2 retransmission setting.

As an example, consider type-2 code blocks as a first example. The modulo distance for 16 QAM is 1 and for 64 QAM is 5. To optimize the 16 QAM bit reliability equalization gain, an offset of 1 would suffice. However, such offset would be disastrous for 64 QAM since the net modulo distance becomes 0, which means complete loss of the bit reliability equalization gain. Hence, a joint optimization for both modulations would set the offset to 5. With this offset, the net modulo distances become 2 and 4 for the 16 QAM and 64 QAM, respectively.

Now consider type-10 code blocks as a second example. The modulo distance for 16 QAM and that for 64 QAM before wrapping are identical to those for the type-2 code blocks just discussed. However, the effects of wrapping need to be considered for type-10 code blocks. In particular, it can be seen that an offset of 5 will make the modulo distance for 64 QAM after wrap-around 0, which removes bit reliability equalization gain for these coded bits. To joint optimization for both modulations and the effects of wrap-around, the offset should be set to 9. With this offset, the net modulo distance becomes 2 for 16 QAM, and net modulo distances for 64 QAM before and after wrapping become 2 and 4, respectively.

The complete RV2 address offset design is provided in Table 10. Therefore, optimal address offset for the RV2 retransmission setting can be selected based on two parameters: the number of filler bits F and the number of dummy bits $N_D$.

TABLE 10

Optimal address offset to RV2 starting point with RV0 for initial transmission

| Code Block Type | # of filler bits F | # of dummy bits $N_D$ | Address Offset |
| --- | --- | --- | --- |
| 1 | 0 | 4 | 5 |
| 2 | 0 | 12 | 5 |
| 3 | 0 | 20 | 4 |
| 4 | 0 | 28 | 4 |
| 5 | 8 | 12 | 2 |
| 6 | 8 | 28 | 2 |
| 7 | 16 | 28 | 4 |
| 8 | 24 | 28 | 1 |
| 9 | 32 | 28 | 7 |
| 10 | 40 | 28 | 9 |
| 11 | 48 | 28 | 3 |
| 12 | 56 | 28 | 0 |

The selection of an optimal RV setting or RV starting point as described above can result in up to 2 dB in SNR gains compared to the fixed retransmission strategy that is currently specified in LTE. FIG. 8 illustrates one such example.

Figure 9:
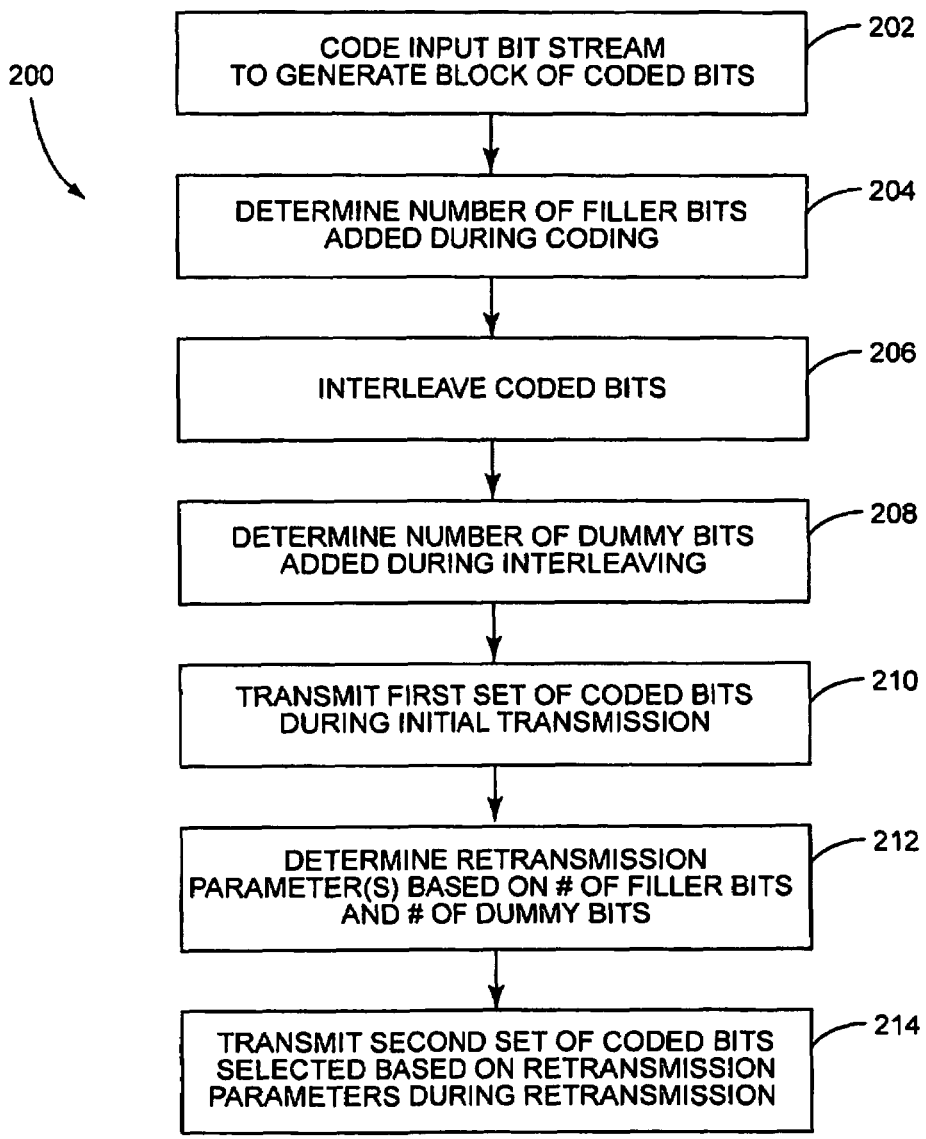
FIG. 9 illustrates an exemplary method implemented by the wireless communication device implementing a retransmission protocol.

FIG. 9 illustrates an exemplary method 200 for implementing a retransmission protocol in a wireless communication terminal. The method 200 could be implemented by a wireless communication terminal 100, e.g., a user terminal in a wireless communication network or a base station, also referred to as an eNodeB in the LTE standard. Method 200 begins by coding an input bit stream to generate a block of coded bits for transmission from the transmitter to a receiver (block 202). In one exemplary embodiment, the coding may be performed by turbo coder 124. During coding, filler bits F may be added to the input bit stream to match the size of the input bit stream to the internal interleaver of the turbo coder 124. The number of filler bits F is determined and stored for later use in selecting retransmission settings (block 204). It may be noted that filler bits are not required in some circumstances. Therefore, the number of filler bits may equal 0. After coding, the coded bits are interleaved (block 206). In one exemplary embodiment, sub-block interleavers 140 are used to interleave the systematic bits S, P1 bits, and P2 bits output by the turbo coder 124. Dummy bits may be added to each of the bit streams output by the turbo coder 124 to match the bit streams to the size of the sub-block interleaver 140. The number of dummy bits $N_D$ added to each of the bit streams is determined and stored for use in selecting retransmission settings (block 208).

As previously noted, the wireless communication terminal 100 may implement a retransmission protocol, such as the hybrid automatic repeat request (HARQ) protocol. To implement type-2 HARQ, different sets of coded bits, e.g., different RVs, are transmitted during an initial transmission and any required retransmissions. More particularly, a first set of coded bits is transmitted during an initial transmission (block 210). One or more retransmission parameters are selected based on the number of filler bits F used for coding and the number of dummy bits $N_D$ used for interleaving (block 212). The retransmission parameters may, for example, comprise the RV setting for the retransmission or an address offset to the RV starting point for a selected RV setting. If a retransmission is requested by the receiver, a second set of coded bits selected based on the retransmission parameters are transmitted to the receiver (block 214).

In one exemplary embodiment, an optimal RV setting for the retransmission is selected based on the number of filler bits F and the number of dummy bits $N_D$. Optimal in this context means the RV setting that requires the lowest SNR to obtain a block error rate of 10%. The selection of the retransmission settings may be further based on the initial code rate used during the initial transmission.

In another exemplary embodiment, the selection of retransmission parameters for the retransmission comprises selection of an address offset to the RV starting point for a selected RV setting. In one exemplary embodiment, the RV2 setting is used for the retransmission to provide incremental redundancy gains, and an address offset to the RV2 setting is selected to jointly optimize bit reliability equalization gains for both 16 QAM and 64 QAM.

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method, implemented by a transmitter, of adapting retransmission settings in a wireless communication terminal, the method comprising:
    coding an input bit stream to generate a block of coded bits for transmission from a transmitter to a receiver;
    determining a number of filler bits added to the input bit stream for said coding;
    interleaving the coded bits;
    determining a number of dummy bits added to said coded bits for said interleaving;
    transmitting, in an initial transmission, a first set of said coded bits;
    determining one or more retransmission parameters based on the code rate of the said initial transmission, number of filler bits used for coding and the number of dummy bits used for interleaving; and
    transmitting, in a retransmission, a second set of said coded bits selected based on said retransmission parameters.

2. The method of claim 1, wherein coding the input bit stream to generate the block of coded bits for transmission comprises:
    coding the input bit stream in a turbo coder having an internal interleaver of a predetermined size; and
    adding filler bits to said input bit stream so that the total number of input bits to said turbo coder with said filler bits added equals the size of the internal interleaver of the turbo coder.

3. The method of claim 2, wherein interleaving the coded bits comprises:
    dividing the coded bits into a systematic bit stream and two parity bit streams;
    adding dummy bits to said systematic bit stream and said parity bit streams;
    interleaving the systematic bit stream and said parity bit streams with said added dummy bits.

4. The method of claim 1, wherein transmitting the first set of said coded bits from said transmitter to a receiver during the initial transmission comprises transmitting a first redundancy version of said coded bit during said initial transmission.

5. The method of claim 4, wherein determining one or more retransmission parameters based on the code rate of the said initial transmission, number of filler bits used for coding and the number of dummy bits used for interleaving comprises determining a second redundancy version of said coded bits based on said number of filler bits and said number of dummy bits.

6. The method of claim 5, wherein transmitting the second set of said coded bits selected based on said retransmission parameters comprises transmitting a second redundancy version of said coded bits in said retransmission.

7. The method of claim 4, wherein determining one or more retransmission parameters based on the code rate of the said initial transmission, number of filler bits used for coding and the number of dummy bits used for interleaving comprises determining a retransmission offset for a second redundancy version of said coded bits based on said number of filler bits and said number of dummy bits.

8. The method of claim 7, wherein transmitting the second set of said coded bits selected based on said retransmission parameters comprises transmitting said second redundancy version of said coded bits in said retransmission with a starting location determined based on said retransmission offset.

9. The method of claim 1, wherein the step of determining one or more retransmission parameters further includes determining retransmission parameters based on a modulation type used in an initial transmission.

10. A wireless communication terminal, comprising:
    a channel coding circuit including an encoder to code an input bit stream to generate a block of coded bits for transmission and an interleaver to interleave the coded bits output by the encoder;
    a transmitter to transmit a first set of said coded bits in an initial transmission and a second set of said coded bits in a retransmission; and
    a control unit to:
    determine one or more retransmission parameters based on the code rate of the said initial transmission, number of filler bits used to code said input bit stream and the number of dummy bits used to interleave the coded bits; and
    select the second set of coded bits transmitted in said retransmission based on said retransmission parameters.

11. The wireless communication terminal of claim 10, wherein the channel coding circuit comprises a turbo coder having an internal interleaver and two parallel convolutional encoders, and wherein the coding circuit is configured to add filler bits to said input bit stream so that that the total number of input bits to said convolutional encoders with said filler bits added equals the size of the internal interleaver of the turbo coder.

12. The wireless communication terminal of claim 11, wherein the channel coding circuit is configured to:

divide the coded bits into a systematic bit stream and two parity bit streams;

add dummy bits to said systematic bit stream and said parity bit streams; and interleave the systematic bit stream and said parity bit streams with said added dummy bits.

13. The wireless communication terminal of claim 10, wherein the control unit and transmitter are configured to transmit a first redundancy version of said coded bits in said initial transmission.

14. The wireless communication terminal of claim 13, wherein the control unit determines a second redundancy version of the coded bits for the retransmission based on the code rate of the said initial transmission, number of filler bits and the number of dummy bits.

15. The wireless communication terminal of claim 13, wherein the control unit and the transmitter are configured to transmit the second redundancy version of the coded bits in the retransmission as the second set of coded bits.

16. The wireless communication terminal of claim 15, wherein the control unit determines a retransmission offset for the second redundancy version of said coded bits based on said code rate of the said initial transmission, number of filler bits and said number of dummy bits.

17. The wireless communication terminal of claim 16, wherein the control unit and the transmitter are configured to transmit the second redundancy version of the coded bits in said retransmission with a starting location determined based on said retransmission offset.

18. The wireless communication terminal of claim 10, wherein the control unit determines one or more retransmission parameters further includes determining retransmission parameters based on a modulation type used in an initial transmission.

* * * * *